(12) United States Patent
Scheiferstein et al.

(10) Patent No.: US 9,982,821 B1
(45) Date of Patent: May 29, 2018

(54) DOUBLED WALL PIPE FLANGE AND COUPLING CONFIGURATION

(71) Applicant: United Technologies Corporation, Hartford, CT (US)

(72) Inventors: Gregory Scheiferstein, West Hartford, CT (US); Steven Dill, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 563 days.

(21) Appl. No.: 14/607,791

(22) Filed: Jan. 28, 2015

(51) Int. Cl.
 *F16L 39/00* (2006.01)
 *B64D 37/32* (2006.01)
 *B64D 45/02* (2006.01)

(52) U.S. Cl.
 CPC ............ *F16L 39/005* (2013.01); *B64D 37/32* (2013.01); *B64D 45/02* (2013.01)

(58) Field of Classification Search
 CPC ....... B64D 37/32; B64D 45/02; F16L 39/005; F16L 39/04; F16L 25/025
 USPC ................................. 285/123.3, 123.15, 904
 See application file for complete search history.

(56) References Cited

U.S. PATENT DOCUMENTS

| | | | | |
|---|---|---|---|---|
| 2,936,999 A * | 5/1960 | Jacobus | ................... | F01D 9/065 415/134 |
| 4,011,732 A * | 3/1977 | Doherty | ................ | F16L 39/005 285/904 |
| 4,106,796 A * | 8/1978 | Asztalos | ............... | F16L 39/005 285/123.12 |
| 4,167,097 A * | 9/1979 | Wosika | ................... | F01D 9/065 415/207 |
| 5,011,193 A * | 4/1991 | Porte | ...................... | F16L 39/005 285/123.1 |
| 6,134,893 A * | 10/2000 | Bonn | ................... | F16L 27/0828 285/904 |
| 6,438,938 B1 * | 8/2002 | Burkholder | ............. | F01D 9/065 184/6.11 |
| 7,530,233 B2 * | 5/2009 | Milazar | ................. | F01D 11/005 415/134 |

(Continued)

FOREIGN PATENT DOCUMENTS

| | | |
|---|---|---|
| GB | 2080474 | 2/1982 |
| WO | 2013052741 | 4/2013 |

OTHER PUBLICATIONS

Extended European Search Report dated Jun. 30, 2016 in European Application No. 16152798.1.

*Primary Examiner* — David Bochna
(74) *Attorney, Agent, or Firm* — Snell & Wilmer L.L.P.

(57) ABSTRACT

In various embodiments, a double wall pipe assembly may comprise a coupling, a first pipe, a second pipe, a first piloted flange and second piloted flange. The coupling may define a minor diameter receivable slot and a major diameter receivable slot. The double wall pipe may be configured to conduct a fluid. The double wall pipe operatively coupled to the coupling. The double wall pipe may comprise a first pipe, a second pipe, a first piloted flange, and a second piloted flange. The second pipe may be sleeved over the first pipe. The first piloted flange may be operatively coupled to the first pipe. The first piloted flange may be installable in the minor diameter receivable slot. The second piloted flange may be coupled to the second pipe. The second piloted flange may be installable in the major diameter receivable slot.

14 Claims, 6 Drawing Sheets

(56) References Cited

U.S. PATENT DOCUMENTS

| | | | |
|---|---|---|---|
| 7,717,473 B1* | 5/2010 | Zhang | F16L 39/04 285/123.15 |
| 2004/0207197 A1* | 10/2004 | Hoang | F16L 39/005 285/123.15 |
| 2005/0050902 A1 | 3/2005 | Anichini et al. | |
| 2009/0256352 A1* | 10/2009 | Petit | F16L 39/005 285/123.15 |
| 2010/0001512 A1 | 1/2010 | Breay et al. | |
| 2011/0233923 A1 | 9/2011 | Kouketsu et al. | |
| 2012/0181384 A1* | 7/2012 | Courpet | F16L 39/04 285/238 |
| 2014/0117162 A1* | 5/2014 | Courpet | F16L 39/005 285/121.1 |

* cited by examiner

DOUBLED WALL PIPE FLANGE AND COUPLING CONFIGURATION

FIELD

The present disclosure relates to gas turbine plumbing, and more particularly, to double wall pipes and associated flanges and couplings that allow leaked fluids to be transmitted to a suitable drain point.

BACKGROUND

Typical double wall pipes in gas turbine engines employ couplings that use high cost flanges that are associated with expensive and inefficient processing. These flanges may also be heavy and include structures that may be optimized. Attachment of the flanges may involve several processing steps including, for example, welding, swaging, and brazing. Moreover, the processing costs account for the majority of the fabrication costs of doubled wall pipe configurations.

SUMMARY

In various embodiments, a double wall pipe may comprise a first fitting, a first pipe, a second pipe, a first piloted flange and a second piloted flange. The first pipe may be operatively coupled to a first fitting. The second pipe may be sleeved over the first pipe. The second pipe may be operatively coupled to the first fitting. The first piloted flange may be operatively coupled to the first pipe. The second piloted flange may be coupled to the second pipe. The second piloted flange may be installable over the first pipe.

In various embodiments, the double wall pipe is installable within a coupling. The coupling may define a minor diameter receivable slot and a major diameter receivable slot. The first piloted flange may be installable within the minor diameter received slot. The second piloted flange may be installable within the major diameter receivable slot.

In various embodiments, the first piloted flange may include a first seal. The second piloted flange may include a second seal. The first seal may be compressible against a first wall portion of the coupling defining the minor diameter receivable slot. The second seal may be compressible against a second wall portion of the coupling defining the major diameter receivable slot. The compression of the first seal and the second seal may retain the double wall pipe to the coupling.

In various embodiments, the double wall pipe may further comprise a collar. The collar may be slidably installed on the second pipe. The collar may be configured to operatively couple to the coupling. The collar may be a threaded collar.

In various embodiments, the first piloted flange may further comprise a first stop. The first stop may be configured to abut a first wall portion defining the minor diameter receivable slot. The second piloted flange may comprise a second stop. The second stop may be configured to abut a second wall portion defining the major diameter receivable slot. The first stop may be positioned on the first piloted flange to facilitate proper installation depth and alignment of the double wall pipe in the coupling.

In various embodiments, gas turbine engine may comprise a compressor, a combustor, a turbine, a case, a coupling, and a double wall pipe. The combustor may be in fluid communication with the compressor. The turbine may be in fluid communication with the combustor. The case may be configured to house at least a portion of at least one of the compressor, the combustor or the turbine. The coupling may comprise a flange. The flange may be attachable to the case. The coupling may define a minor diameter receivable slot and a major diameter receivable slot. The double wall pipe configured to conduct a flammable fluid from first gas turbine engine portion to a second gas turbine engine portion. The double wall pipe may be operatively coupled to the coupling. The double wall pipe may comprise a first fitting, a first pipe, a second pipe, a first piloted flange and a second piloted flange. The first pipe may be operatively coupled to a first fitting. The second pipe may be sleeved over the first pipe. The second pipe may be operatively coupled to the first fitting. The first piloted flange may be operatively coupled to the first pipe. The first piloted flange may be installable in the minor diameter receivable slot. The second piloted flange may be coupled to the second pipe. The second piloted flange may be installable in the major diameter receivable slot. The second piloted flange may be installable over the first pipe. The gas turbine engine may further comprise a collar. The collar may be slidably installed on the second pipe. The collar may be configured to operatively couple to the coupling.

In various embodiments, the first piloted flange may comprise a first stop. The first stop may be configured to abut a first wall portion defining the minor diameter receivable slot. The second piloted flange may comprise a second stop. The second stop may be configured to abut a second wall portion defining the major diameter receivable slot.

In various embodiments, the first piloted flange may include a first seal. The second piloted flange may include a second seal. The first seal may be compressible against a first wall portion of the coupling defining the minor diameter receivable slot. The second seal may be compressible against a second wall portion of the coupled defining the major diameter receivable slot.

In various embodiments, a double wall pipe assembly may comprise a couple, a first pipe, a second pipe, a first piloted flange and second piloted flange. The coupling may define a minor diameter receivable slot and a major diameter receivable slot. The double wall pipe may be configured to conduct a fluid. The double wall pipe operatively coupled to the coupling. The double wall pipe may comprise a first pipe, a second pipe, a first piloted flange, and a second piloted flange. The second pipe may be sleeved over the first pipe. The first piloted flange may be operatively coupled to the first pipe. The first piloted flange may be installable in the minor diameter receivable slot. The second piloted flange may be coupled to the second pipe. The second piloted flange may be installable in the major diameter receivable slot.

In various embodiments, the first piloted flange includes a first seal. The first seal may be compressible against a first wall portion of the coupling defining the minor diameter receivable slot. The second piloted flange may include includes a second seal. The second seal may be compressible against a second wall portion of the coupling defining the major diameter receivable slot. The compression of the first seal and the second seal may retain the double wall pipe to the coupling.

In various embodiments, the double wall pipe assembly may further comprise a collar. The collar may be slidably installed on the second pipe. The collar may be configured to operatively couple to the coupling.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice these embodiments, it should be understood that other embodiments may be realized and that logical changes and adaptations in design and construction may be made in accordance with the present disclosure and the teachings herein. Thus, the detailed description herein is presented for purposes of illustration only and not for providing limitations on the scope of the disclosure. For example, the steps recited in any of the methods or process descriptions may be executed in any order and are not limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Moreover, surface shading lines may be used throughout the figures to denote different parts but not necessarily to denote the same or different materials.

Figure 1A:
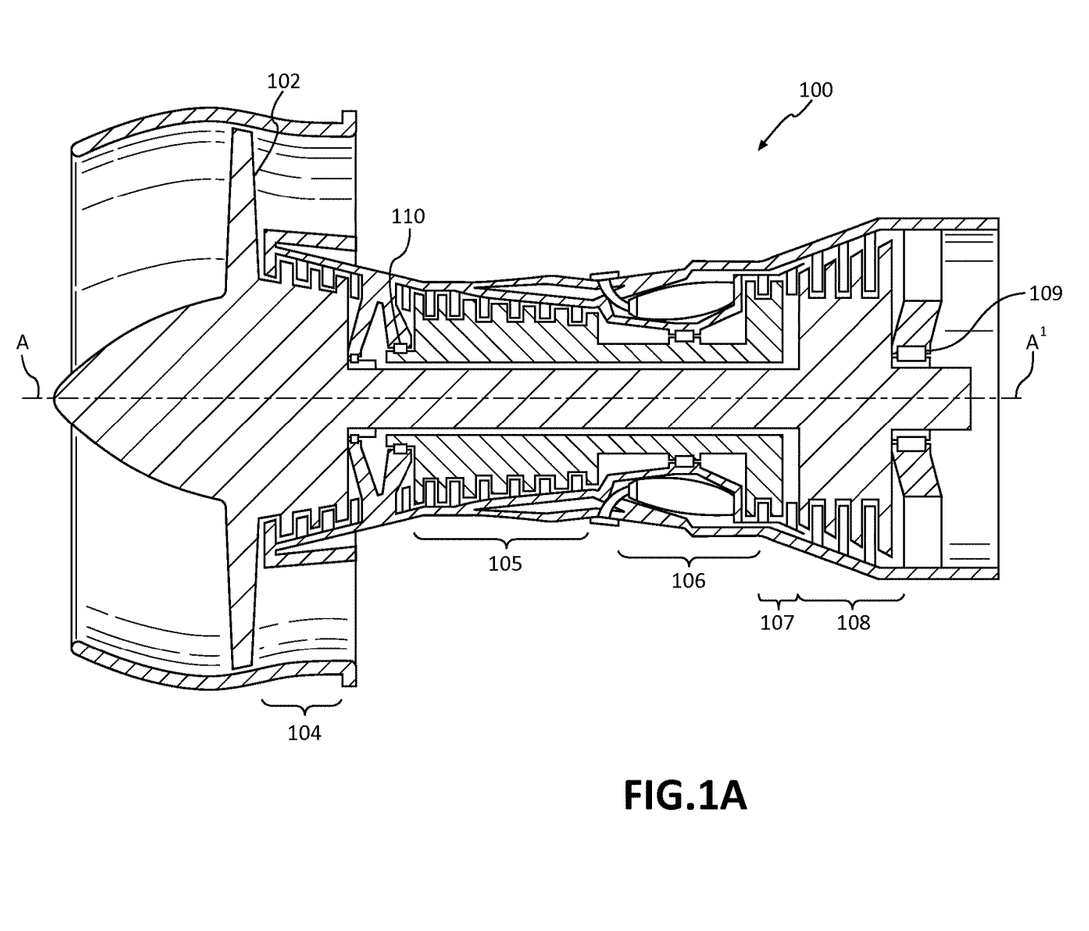
FIG. 1A illustrates cross-sectional view of an exemplary gas turbine engine, in accordance with various embodiments.

Referring to FIG. 1, a gas turbine engine 100 (such as a turbofan gas turbine engine) is illustrated according to various embodiments. Gas turbine engine 100 is disposed about axial centerline axis A-A', which may also be referred to as axis of rotation A-A'. Gas turbine engine 100 may comprise a fan 140, compressor sections 104 and 105, a combustion section 106, and turbine sections 107, 108. Air compressed in the compressor sections 104, 105 may be mixed with fuel and burned in combustion section 106 and expanded across the turbine sections 107, 108. The turbine sections 107, 108 may include high pressure rotors and low pressure rotors, which rotate in response to the expansion. The turbine sections 107, 108 may comprise alternating rows of rotary airfoils or blades and static airfoils or vanes. Cooling air may be supplied to the turbine sections 107, 108 from the compressor sections 104, 105. A plurality of bearings 109 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation A-A'. For example, fan 102 may be referred to as forward of turbine section 107 and turbine section 107 may be referred to as aft of fan 102. Typically, during operation of gas turbine engine 100, air flows from forward to aft, for example, from fan 102 to turbine section 107. As air flows from fan 102 to the more aft components of gas turbine engine 100, axis of rotation A-A' may also generally define the direction of the air stream flow.

In various embodiments, double wall pipes may be employed to transport fluids, and particularly, flammable fluids, through aircraft structures and in aircraft volumes (e.g., along the engine cage). These double wall pipes typically are associated with expensive and resource intensive manufacturing processes. For example, typical double wall pipe assemblies may employ orbital welds, swaging, and brazing of flanges. However, these swaging and brazing processes may be expensive and time-consuming.

Figure 1B:
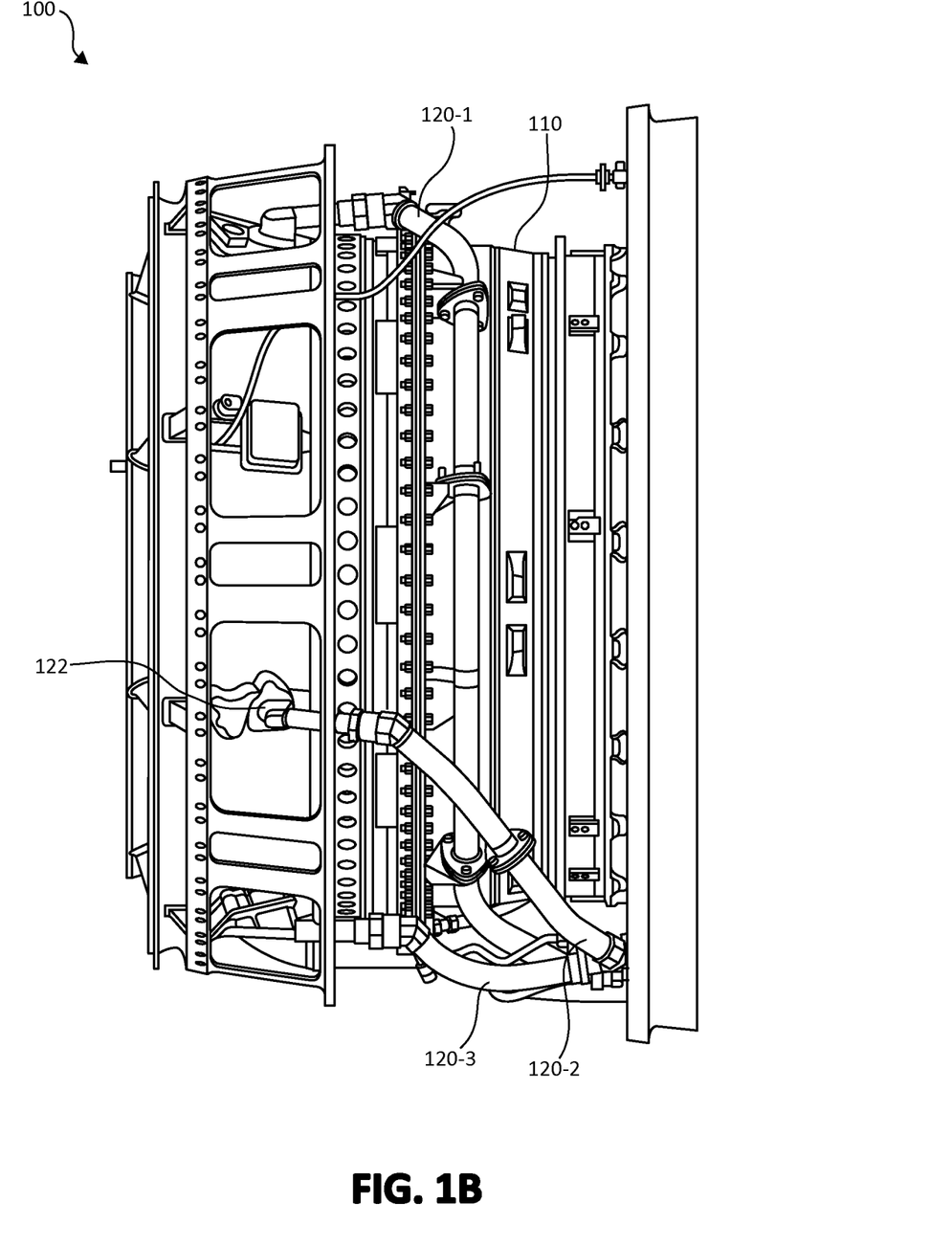
FIG. 1B illustrates a side view of an exemplary portion of a gas turbine engine case, in accordance with various embodiments.

The double wall pipes defined herein are described in the context of use in aerospace applications, and in particular, in the context of use in conjunction with gas turbine engines including, for example, gas turbine engine 100 as shown in FIG. 1A and FIG. 1B. However, the double wall pipe configurations described herein may be used in any suitable double wall pipe application and/or environment. As such, the description of the double wall pipes in the context of a gas turbine engine is for illustrative purposes only and is not intended to limit the application.

In various embodiments and with reference to FIG. 1A and FIG. 1B, double wall pipe 120 may run along a portion of or along the outside perimeter of case 110. Case 110 may be any suitable portion of the case surrounding engine components of gas turbine engine 100. For example, case 110 may be the case surrounding all or a portion of compressor section 104, compressor section 105, combustor 106, turbine section 107, and/or turbine section 108. Moreover, case 110 may cover one or more of the components that make up gas turbine engine 100. Similarly, double wall pipe 120 may move fluid from one section of gas turbine engine 100 to another section of gas turbine engine 100 along and outside case 110.

In various embodiments, gas turbine engine 100 and/or case 110 may comprise one or more double wall pipes 120 including, for example, double wall pipe 120-1, double wall pipe 120-2, and/or double wall pipe 120-3 in FIG. 1B. Double wall pipe 120 may include any suitable flange coupling and/or fitting. For example double wall pipe 120-2 may comprise a fitting 122 that is configured to interface with case 110.

In various embodiments with reference to FIG. 2A through FIG. 2D. Double wall pipe 220 may comprise a first pipe 221 and a second pipe 223. First pipe 221 and second pipe 223 may be operatively coupled to first fitting 222 (e.g., by orbital welded). Second pipe 223 may sleeve over and/or be installed over first pipe 221. Second pipe 223 may be operably coupled to first fitting 222 (e.g., by orbital welding). In this regard, double wall pipe 220 may comprise a chamber 225 and/or a channel between first pipe 221 and second pipe 223. Any fluid leaked from first pipe 221 may be contained in and/or conducted through the chamber 225 to a suitable drainage point.

In various embodiments, piloted flange assembly 230 may comprise a first piloted flange 232 and a second piloted flange 234. Piloted flange assembly 230 may be installable on double wall pipe 220. In this regard, piloted flange assembly 230 may be operatively coupled to double wall pipe 220 in any suitable fashion including, for example, welding, swaging, brazing and/or the like.

In various embodiments and in response to first pipe 221 and second pipe 223 are operatively coupled to first fitting 222, a first piloted flange 232 may be installed on first pipe 221. First piloted flange 232 may be operatively coupled to first pipe 221. For example, first piloted flange 232 may be coupled to first pipe 221 with an orbital weld. Second piloted flange 234 may then be sleeved over first piloted flange 232 and first pipe 221 and operatively coupled to second pipe 223. In this regard, second piloted flange 234 may be coupled to second pipe 223 with an orbital welded. Piloted flange assembly 230 may be installable in a coupling to join segments of double wall pipes 220.

Figure 2A:
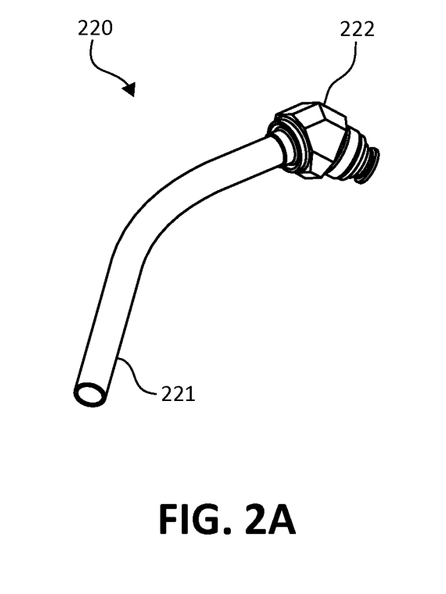
FIG. 2A illustrates a perspective view of a first manufacturing stage of a doubled wall pipe, in accordance with various embodiments.
Figure 2B:
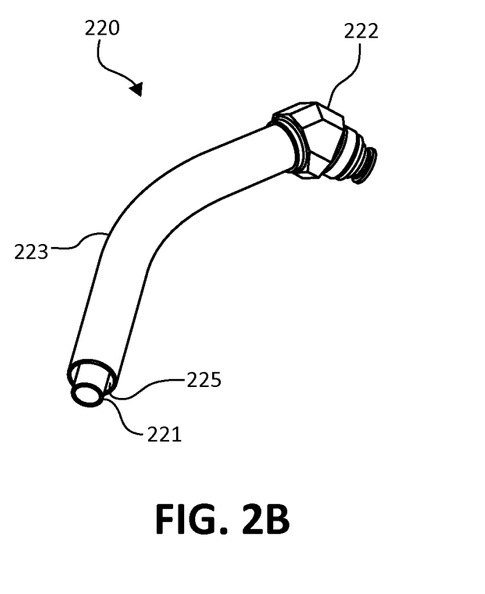
FIG. 2B illustrates a perspective view of a second manufacturing stage of a doubled wall pipe, in accordance with various embodiments.
Figure 2C:
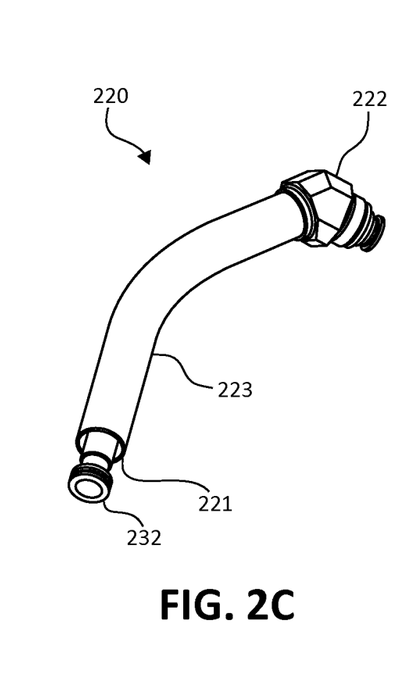
FIG. 2C illustrates a perspective view of a third manufacturing stage of a doubled wall pipe, in accordance with various embodiments.
Figure 2D:
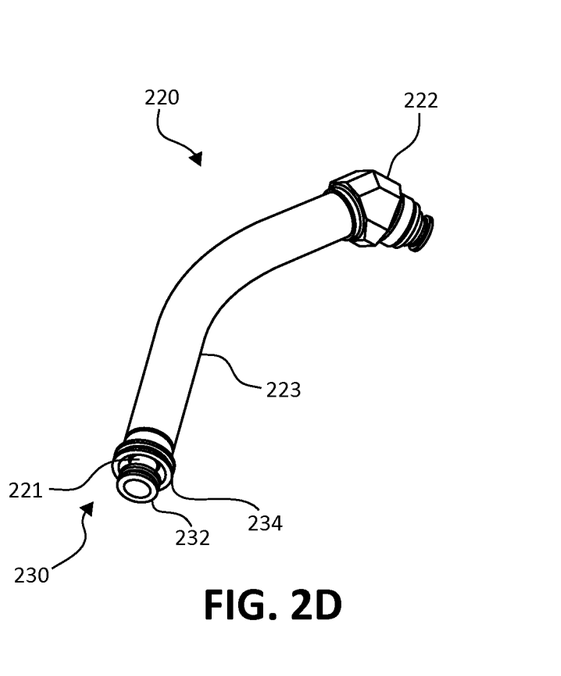
FIG. 2D illustrates a perspective view of a fourth manufacturing stage of a doubled wall pipe, in accordance with various embodiments.
Figure 3:
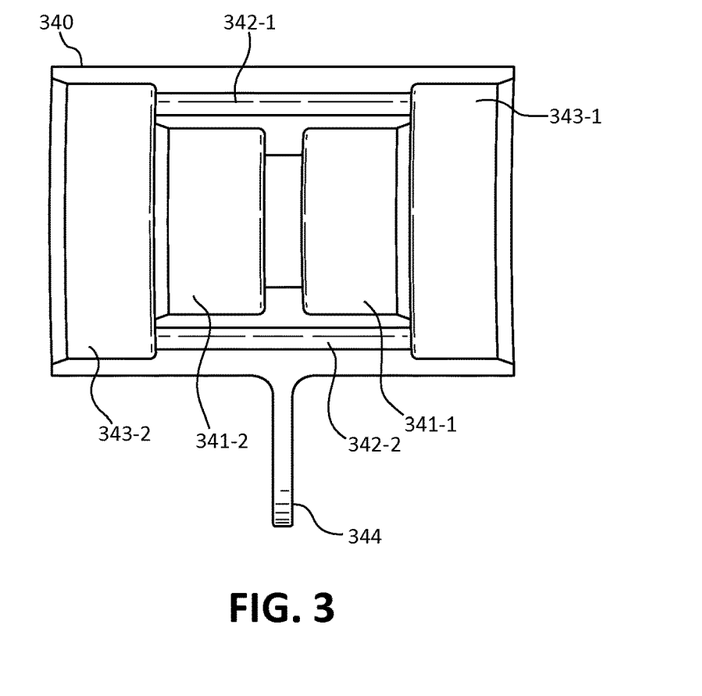
FIG. 3 illustrates a cross-sectional view of a coupling for a doubled wall pipe, in accordance with various embodiments.

In various embodiments and with reference to FIG. 2D and FIG. 3, coupling 340 may be configured to receive the piloted flange assembly 230. Coupling 340 may define one or more minor diameter receivable slots 341, which are shown minor diameter receivable slots 341-1 and minor diameter receivable slot 341-2 in FIG. 3. Minor diameter receivable slot 341 may be defined and/or configured to receive first piloted flange 232. Coupling 340 may also comprise and/or define one or more major diameter receivable slots 343, which are shown major diameter receivable slot 343-1 and major diameter receivable slot 343-2. Major diameter receivable slot 343 is configured to receive and/or support second piloted flange 234.

In various embodiments, coupling 340 may comprise a flange 344. Flange 344 may be configured to support and/or attach coupling 340 to a support structure (e.g., case 110 as shown in FIGS. 1A and 1B). Coupling 340 may also comprise one or more passageways 342 operatively configured to conduct fluid between a first major diameter receivable slot 343-1 to a second major diameter receivable slot 343-2.

Figure 4A:
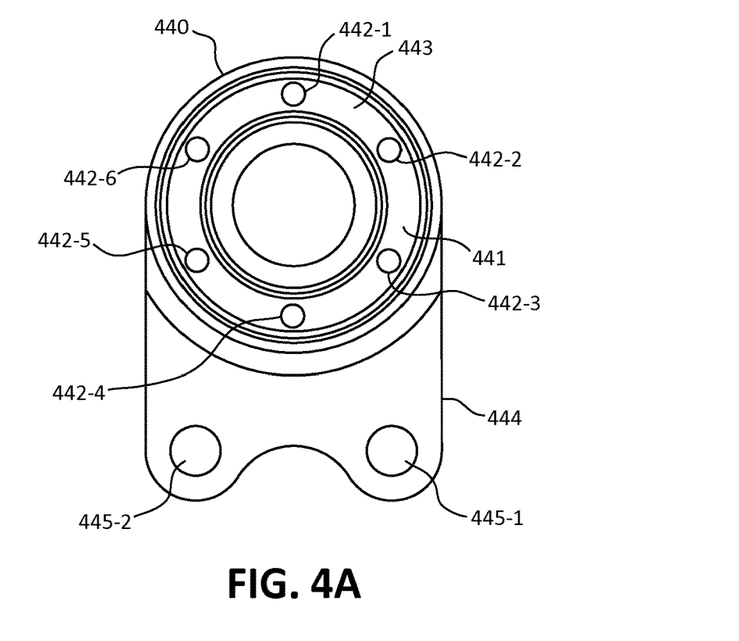
FIG. 4A illustrates a front view of a coupling comprising a first flange arrangement for a doubled wall pipe, in accordance with various embodiments.
Figure 4B:
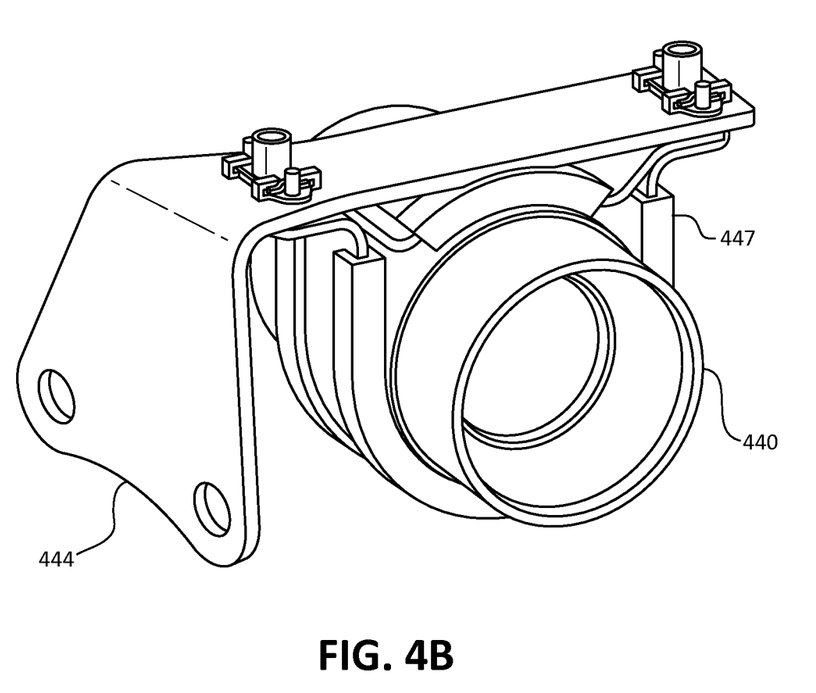
FIG. 4B illustrates a perspective view of a coupling comprising a second flange arrangement for a doubled wall pipe, in accordance with various embodiments.

In various embodiments and with reference to FIG. 4A and FIG. 4B, coupling 440 may define a plurality of passages 442 which are shown as passage 442-1, passage 442-2, passage 442-3, passage 442-4, passage 442-5, and/or passage 442-6 in FIG. 4A. In this regard coupling 440 may include any suitable number of passages.

Passage 442 may be configured to conduct a fluid from in the volume defined between the first pipe and the second pipe of a doubled wall pipe assembly. In this regard, fluid leaked from the first pipe may be captured and contained in the volume created or defined between the first pipe and the second pipe. This fluid may be conducted across one or more couplings 440 so that it may be drained at a suitable drain point.

In various embodiments, minor diameter receivable slot 441 may be isolated from major diameter receivable slot 443. In this regard, fluid conducted through an inner pipe received in minor diameter receivable slot 441 may be isolated from the volume defined between an inner pipe (e.g., first pipe 221 as shown in FIG. 2D) and an outer pipe (e.g., second pipe 223 as shown in FIG. 2D), where the outer pipe is received in major diameter receivable slot 443.

In various embodiments, coupling 440 may also comprise flange 444. Flange 444 may be any suitable structure, including an integrally formed flange with one or more attachment points such as, for example, attachment point 445-1 and/or attachment point 445-2, as shown in FIG. 4A. Flange 444 may also be operably coupled to a bracket 447. Bracket 447 may be configured to engage and/or hold coupling 440 as shown in FIG. 4B. Flange 444 may be installable on any suitable structure including, for example, a gas turbine engine case (e.g., case 110 as shown in FIGS. 1A and 1B).

Figure 5:
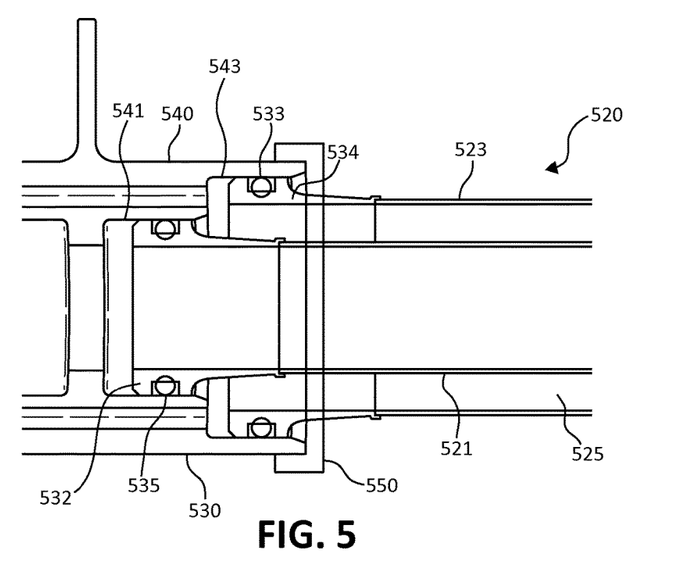
FIG. 5 illustrates a cross-sectional view of a coupling with a first doubled wall pipe installed within the coupling, in accordance with various embodiments.

In various embodiments and with reference to FIG. 5, double wall pipe 520 may be receivable in coupling 540. More specifically, flange assembly 530 of double wall pipe 520 may be receivable in coupling 540. In this regard, first pipe 521 may comprise and/or be coupled to first piloted flange 532. First piloted flange 532 and first pipe 521 may be received in and/or installable in minor diameter receivable slot 541 of coupling 540. Second pipe 523 may comprise and/or be coupled to second piloted flange 534. Second piloted flange 534 and second pipe 523 may be received by and/or may be installable in major diameter receivable slot 543 of coupling 540.

In various embodiments, first piloted flange 532 may comprise a channel and/or slot capable of receiving and retaining a seal 535. Seal 535 may be installed on first piloted flange 532 and may be compressed in response to first piloted flange 532 being installed in minor diameter receivable slot 541. In this regard, seal 535 may be capable of and/or configured to retain first piloted flange 532 within minor diameter receivable slot 541. Similarly, second piloted flange 534 may include a channel and/or slot that is configured to receive a seal 533. Seal 533 may be installed on second piloted flange 534. In response to being installed in major diameter receivable slot 543, seal 533 may compress and retain second piloted flange 534 and coupling 540.

In various embodiments, double wall pipe 520 and/or flange assembly 530 may further include a collar 550. Collar 550 may be slidably installed on double wall pipe 520 and may be configured to operatively couple to coupling 540. Collar 550 may be a threaded collar. In this regard, collar 550 may be configured to operatively couple to and/or threadably engage coupling 540 to retain flange assembly 530 and/or double wall pipe 520 in coupling 540. Collar 550 may also be secured and/or operatively coupled to coupling 540 with one or more fasteners such as, for example screws, set screws and/or any other suitable mechanical and/or chemical fastener.

Figure 6:
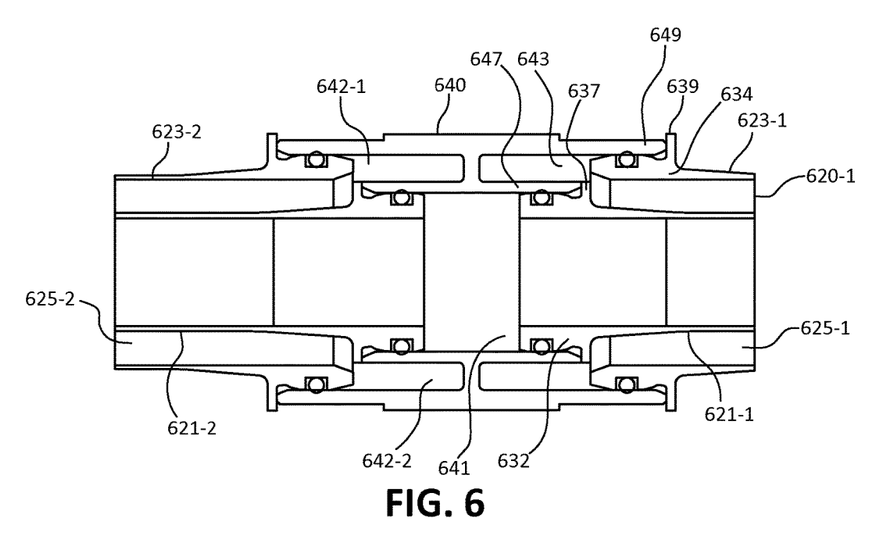
FIG. 6 illustrates a cross-sectional view of a coupling with a first doubled wall pipe and a second doubled wall pipe installed within the coupling, in accordance with various embodiments.

In various embodiments and with reference to FIG. 6, coupling 640 may be configured as a conduit configured to connect a first double wall pipe 620-1 to a second double wall pipe 620-2. In this regard coupling 640 may be configured to define a first fluid channel that is capable of providing fluid communication between first pipe 621-1 and first pipe 621-2. Coupling 640 may further define a second fluid communication channel configured to provide fluid communication between second pipe 623-1 and second pipe 623-2. This fluid communication may be further facilitated by passage 642-1 and passage 642-2. In this regard, passages 642 may be configured to conduct fluids leaked from first pipe 621 into the volume defined between first pipe 621 and second pipe 623. These passages 642 may be configured to conduct the leaked fluid to any suitable drain point.

In various embodiments, first piloted flange 632 may comprise a stop 637. Stop 637 may be configured to ensure proper installation depth and alignment of first piloted flange 632. Stop 637 may be defined as a radial stop that is configured to abut a first abutment structure 647. First abutment structure 647 may be defined along or on a structure that defines minor diameter receivable slot 641. Similarly, second piloted flange 634 may comprise and/or include a stop 639. Stop 639 may be configured to ensure proper installation depth and alignment of second piloted flange 634. Stop 639 may be installable against or may be configured to abut a second abutment structure 649. Second abutment structure 649 may be defined on a structure that defines major diameter receivable slot 643.

In various embodiments, the double wall pipe structures, couplings, fittings, and support structures reduce the complexity of manufacturing, the cost of manufacturing, and the overall weight of the assembly. By employing the various structures discussed herein, the manufacturer ability and the cost of manufacture of double wall pipes is improved.

Benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, such benefits, advantages, and any elements that may cause any benefit or advantage to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A double wall pipe assembly, comprising:
   a first pipe operatively coupled to a first fitting at a second terminus of the first pipe;
   a second pipe sleeved over the first pipe and operatively coupled to the first fitting at a second terminus of the second pipe,
   wherein the first fitting maintains a relative position of the first pipe and the second pipe;
   a first piloted flange operatively coupled to the first pipe at a first terminus of the first pipe;
   a second piloted flange coupled to the second pipe at a first terminus of the second pipe, wherein the second piloted flange is installable over the first pipe; and
   a coupling defining a minor diameter receivable slot and a major diameter receivable slot,
   wherein the first piloted flange is installable within the minor diameter received slot and the second piloted flange is installable within the major diameter receivable slot,
   the first piloted flange includes a first seal and the second piloted flange includes a second seal,
   the first seal is compressible against a first wall portion of the coupling defining the minor diameter receivable slot and wherein the second seal is compressible against a second wall portion of the coupling defining the major diameter receivable slot.

2. The double wall pipe assembly of claim 1, wherein compression of the first seal and the second seal retains the first pipe and the second pipe to the coupling.

3. The double wall pipe assembly of claim 1, further comprising a collar slidably installed on the second pipe and configured to operatively couple to the coupling.

4. The double wall pipe assembly of claim 3, wherein the collar is a threaded collar.

5. The double wall pipe assembly of claim 1, wherein the first piloted flange further comprises a first stop that is configured to abut a first wall portion defining the minor diameter receivable slot and the second piloted flange comprises a second stop that is configured to abut a second wall portion defining the major diameter receivable slot.

6. The double wall pipe assembly of claim 5, wherein the first stop is positioned on the first piloted flange to facilitate a proper installation depth and alignment of the first pipe and the second pipe in the coupling.

7. The double wall pipe assembly of claim 1, wherein the first piloted flange includes a first seal and a first stop, the first stop configured to abut a first wall portion defining the minor diameter receivable slot,
    wherein the second piloted flange includes a second seal and a second stop that is configured to abut a second wall portion defining the major diameter receivable slot,
    wherein the first seal is disposed between a terminus of the first piloted flange and the first stop, and
    the second seal is disposed between a terminus of the second piloted flange and the second stop.

8. A gas turbine engine comprising,
a compressor;
a combustor in fluid communication with the compressor;
a turbine in fluid communication with the combustor;
a case configured to house at least a portion of at least one of the compressor, the combustor or the turbine;
a coupling comprising a flange, the flange attachable to the case, the coupling defining a minor diameter receivable slot and a major diameter receivable slot;
a double wall pipe configured to conduct a flammable fluid from a first gas turbine engine portion to a second gas turbine engine portion, the double wall pipe operatively coupled to the coupling,
the double wall pipe comprising,
    a first pipe operatively coupled to a first fitting;
    a second pipe sleeved over the first pipe and operatively coupled to the first fitting;
    a first piloted flange operatively coupled to the first pipe and installable in the minor diameter receivable slot; and
    a second piloted flange coupled to the second pipe installable in the major diameter receivable slot,
wherein the second piloted flange is installable over the first pipe,
the first piloted flange is operatively coupled to a first terminus of the first pipe,
the second piloted flange is operatively coupled to a first terminus of the second pipe,
the first fitting is operatively coupled to a second terminus of the first pipe, and
the second fitting is operatively coupled to a second terminus of the second pipe.

9. The gas turbine engine of claim 8, further comprising a collar slidably installed on the second pipe and configured to operatively couple to the coupling.

10. The gas turbine engine of claim 8, wherein the first piloted flange further comprises a first stop that is configured to abut a first wall portion defining the minor diameter receivable slot and the second piloted flange comprises a second stop that is configured to abut a second wall portion defining the major diameter receivable slot.

11. The gas turbine engine of claim 8, wherein the first piloted flange includes a first seal and the second piloted flange includes a second seal.

12. The gas turbine engine of claim 11, wherein the first seal is compressible against a first wall portion of the coupling defining the minor diameter receivable slot and wherein the second seal is compressible against a second wall portion of the coupled defining the major diameter receivable slot.

13. A double wall pipe assembly, comprising:
    a coupling defining a minor diameter receivable slot and a major diameter receivable slot;
    a double wall pipe configured to conduct a fluid, the double wall pipe operatively coupled to the coupling, and comprising,
    a first pipe;
    a second pipe sleeved over the first pipe;
    a first piloted flange operatively coupled to the first pipe and installable in the minor diameter receivable slot; and
    a second piloted flange coupled to the second pipe installable in the major diameter receivable slot,
wherein the first piloted flange includes a first seal that is compressible against a first wall portion of the coupling defining the minor diameter receivable slot and the second piloted flange includes a second seal that is compressible against a second wall portion of the coupled defining the major diameter receivable slot,
wherein compression of the first seal and the second seal retains the double wall pipe to the coupling,
wherein the first piloted flange includes a first stop configured to abut a first wall portion defining the minor diameter receivable slot,
wherein the second piloted flange includes a second stop configured to abut a second wall portion defining the major diameter receivable slot,
wherein the first seal is disposed between a terminus of the first piloted flange and the first stop, and
the second seal is disposed between a terminus of the second piloted flange and the second stop.

14. The double wall pipe assembly of claim 13, a collar slidably installed on the second pipe and configured to operatively couple to the coupling.

* * * * *